United States Patent Office 3,095,608
Patented July 2, 1963

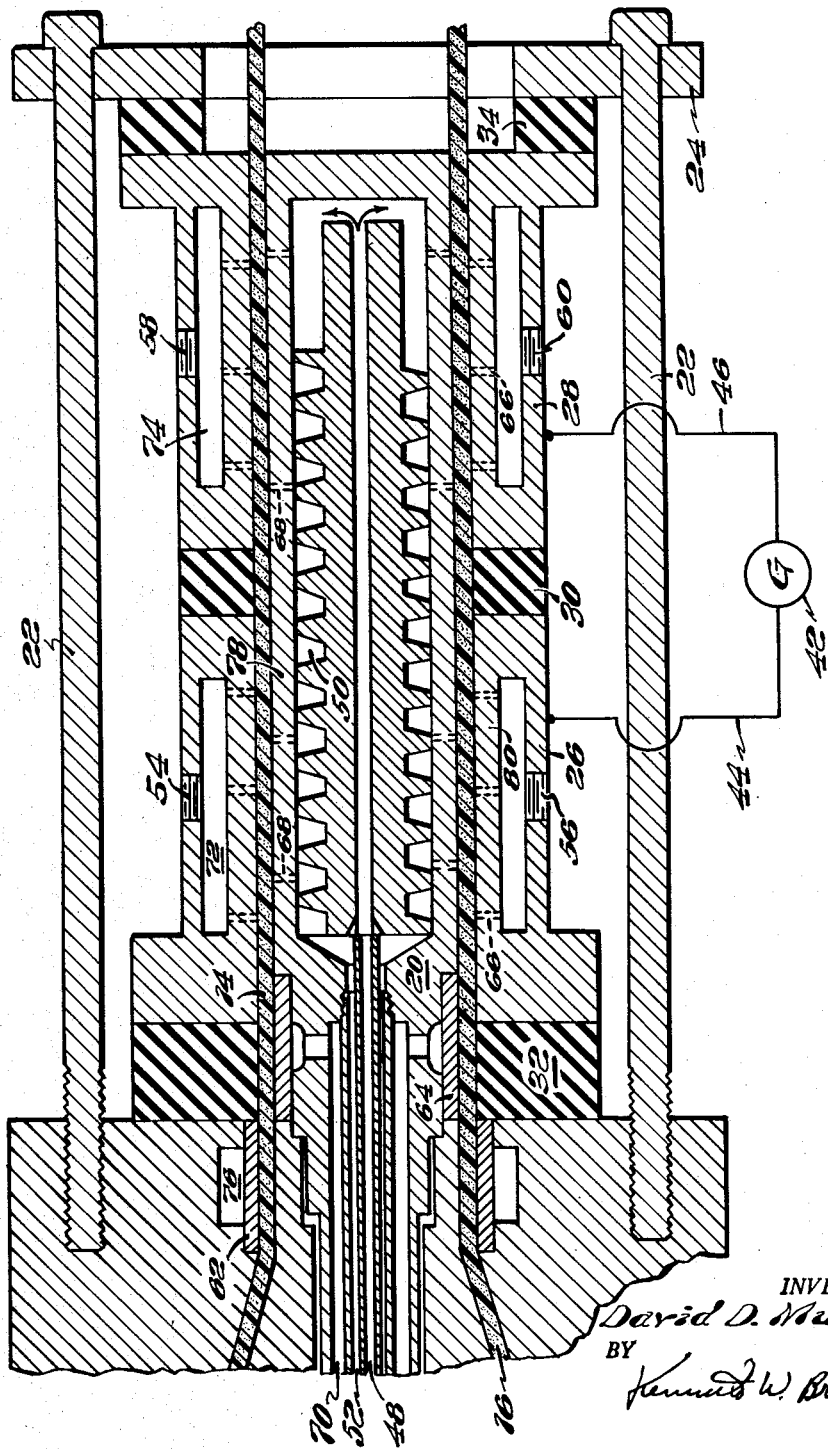

3,095,608
PROCESS AND APPARATUS FOR EXTRUDING AND CURING POLYMERIC COMPOSITIONS
David D. Munsell, Manchester, Mass., assignor to Cabot Corporation, Boston, Mass., a corporation of Delaware
Filed Dec. 9, 1959, Ser. No. 858,396
7 Claims. (Cl. 18—14)

This invention relates to a process and apparatus for the simultaneous extrusion and curing of polymeric compositions.

It has been suggested in copending application U.S. Serial No. 659,867 of Boonstra, filed May 17, 1957, which issued on February 28, 1961, as U.S. Patent 2,972,-780, that heat-curable polymeric compositions may be continuously cured as they are extruded, provided a very high-speed heating system is employed to bring the composition to a uniform active curing temperature in the short time available before it must be released from the confined forming passages. While dielectric methods of conducting the high-speed heating step of such a process are far superior to ordinary heat-transfer techniques, there is still considerable danger during simultaneous extrusion and curing operations that at times the composition being extruded and cured may become overheated and tend to stick to the contacting surfaces of the extruder-heater passages, with consequent roughening of the surface of the article being extruded. This undersirable tendency is particularly noticeable on the inside surfaces of hollow articles such as pipes and tubes which are extruded with the aid of an inner mandrel, and quite often, due to tension developed, shows up as a resulting waviness or irregularity of the outside surfaces also.

It is accordingly the principal object of my invention to provide an improved method and apparatus for curing such heat-curable polymeric bodies to a form-stable state simultaneously as they are being extruded continuously in the approximate shape desired in the finished article.

It is another object of the invention to provide such a process and apparatus in which provision is made to prevent overheating, sticking or roughening of the product surfaces.

It is a further object of this invention to provide a method of avoiding the overheating and resulting sticking to the forming parts of the extruder which tend to happen at times when continuously extruding and simultaneously curing such heat-curable polymer compositions.

It is a still further object of this invention to provide an improved method and apparatus for simultaneously extruding and curing tubular objects of substantially smooth and uniform internal and external diameters from a heat-curable polymeric composition which must be heated above its normal extrusion temperature in order for appreciable curing to take place.

The objects of my invention are accomplished in general by selectively cooling those parts of the system which support and shape the heat-curable composition during the time that it is being simultaneously shaped and cured sufficiently to be form stable as it emerges from the shaping parts. This selective cooling is achieved by circulating within the walls of the shaping parts an appropriate fluid the temperature of which is below that of the composition undergoing the simultaneous shaping and curing. When a hollow object such as a pipe is to be extruded, cooling of the internal shaping part or mandrel is especially important. To assure good circulation of the coolant uniformly through critical areas such as the mandrel, it may be forced at high speed in a positive manner through a circuitous passage such as a continuous helical groove located within said mandrel near the outer or shaping surface thereof.

In the case of extrusion of pipe, tubing, conduit or wire coverings, the best control of temperature and uniform curing conditions has been obtained by the use of dielectric heating supplied by multiple oppositely charged outer electrodes and an inner neutral electrode. Any internal metallic cord or sheath in the article, such as the conductor cord in a covered wire or cable, can serve as the inner electrode. One or more pairs of outer electrodes may be used. The primary advantage of such a system is the prevention of wasted or dissipated energy. Arcing tendencies are minimized in this way, and the overheating often caused by an inner charged or "hot" electrode is also avoided, thus aiding in the accomplishment of the chief objects of this invention. It is also possible to use a single outer electrode and inner "hot" electrode provided a suitable coolant passage is included in each of the electrodes. (See the drawing in the Boonstra Patent U.S. 2,972,780 referred to hereinabove for details regarding the wiring of the dielectric generator to such single outer and inner electrodes.)

The compositions which can be shaped and simultaneously cured by the process and apparatus of this invention with the greatest advantage may be generally described as filled, heat-curable polymeric compositions which must be heated above their satisfactory extrusion temperatures for curing to be accomplished. Representative compositions within this classification are based on polyethylenes, vinyl polymers, and natural and synthetic rubbers. One of the principal classes of such compositions has been described in copending U.S. application, S.N. 597,320, Dannenberg, Polyethylene Composition and Method of Manufacture, filed July 12, 1956, now abandoned.

My invention will be better understood and appreciated from the following description thereof taken in connection with the accompanying drawing of a longitudinal cross-section of a typical preferred embodiment of apparatus incorporating all essential as well as certain optional features of the invention. The drawing depicts only the special die assembly at the exit end of the extruder. The main body of the extruder is not shown, including such more or less standard features as a charging opening for introducing the feed composition and a relatively slow but safe, e.g. thermostatically controlled, system of heating said feed composition to the proper extrusion temperature, necessarily a temperature at least slightly below the active curing level. A controlled electrical or circulating oil or similar heating system is appropriate. The feed material may be conventionally fed through an extruder by a worm or feed screw, using either an offset or an in-line head design. Finally the plasticized and softened composition enters the die assembly section of the extruder shown in the drawing in which 16 is a converging zone of cylindrical cross-section within which is concentrically fixed by struts or other suitable means a mandrel 20. The die assembly is fastened to the main body of the extruder by bolts 22 and bolt ring 24. Dielectric heating means consist of the high-frequency generator 42 connected by wires 44 and 46 to external electrodes 26 and 28 which are completely insulated from each other by insulation ring 30 and thus form the main section of the die-passage assembly. Further insulation rings 32 and 34 are provided to isolate these electrodes from the main body of the extruder. Mandrel 20 then serves as an inner neutral electrode for transmitting electrical energy back and forth from the two outer electrodes and thus through the shaped polymeric composition in annular passage 14.

The surface temperatures of the mandrel 20 and combination die and electrode members 26 and 28 are controlled by use of fluid coolant. Examples of fluids which may be used for cooling are oil, water, air, carbon dioxide, gas-liquid solutions such as nitrogen-alcohol, liquid nitrogen, and many other heat exchange liquids, including mixtures of certain of the foregoing, although this invention is not limited to the use of any one or more of these substances. Fluid coolant is introduced into mandrel 20 by way of axially positioned inlet pipe 48 and then from the discharge end of this pipe 48 flows back through spiral channel 50 and thence out through annular passage 52 which surrounds inlet pipe 48 at the entrance portion of said pipe 48. Fluid coolant for the die surface is introduced through separate inlets 54 and 58 to annular channels 72 and 74 in which it circulates within separate electrode sections 26 and 28 before discharging through separate outlets such as 56 and 60.

For added insurance against sticking, friction between both inner and outer surfaces of the tubular object extruded and the mandrel and die surfaces may be reduced by forcing a lubricant oil into the respective interfaces through porous bronze bushings 64 and 62 located respectively around the outer surface of the mandrel 20 and inner surface of the die assembly at the upstream end of each. Alternatively or additionally, a lubricating action can be achieved at these same interfaces by providing a series of liquid coolant bleed holes at appropriate points, e.g. ports 68 in the outer wall 78 of the mandrel 20 and ports 66 in inner wall 80 of the die assembly. This may be particularly advantageous when the fluid coolant is a good lubricant. If separate lubrication is used, the lubricating fluid, such as lubricating oil, may be conveniently conducted to inner bushing 64 through an annular channel 70 which surrounds the wall of the cooling fluid return passage 52 of the mandrel 20. Lubricating fluid may likewise be supplied from outside the extruder by means of a radial port (not shown) which communicates with the annular channel 76 surrounding the outer bushing 62.

The basic advantages of the present process and apparatus are illustrated by the following examples comparing the proper operation thereof with the operation thereof with a part or all of the cooling system not in use.

*Example 1*

Three sections of 2-inch polyethylene pipe were extruded and cured in exactly the same manner except as to cooling, the first having coolant passed through neither die nor mandrel, the second having only the die cooled, and the third having both die and mandrel cooled in accordance with this invention. The apparatus used was identical with that of the accompanying drawing with the exception that the interfaces had no direct lubrication, as for example, through ports 66 and 68 or bronze bushings 64 and 62. All three samples consisted of uniform 50-pound mixtures containing by weight 40 parts of Alathon 10, a low-density polyethylene product of E. I. du Pont de Nemours and Co., Inc., having a density of 0.92, a Vicat softening point of 201° F., and requiring a temperature of at least 300° F. for ready extrusion, 60 parts of SRF carbon black, and 1.5 parts of dicumyl peroxide, an organic-peroxide free-radical forming crosslinking agent the minimum active decomposition temperature for which is well above 300° F. The samples were separately fed through a charging opening in granular form into a thermostatically controlled heating section, where they were heated above their form-holding temperature to about 275° F., and then into a shaping section equipped basically in the manner shown in the accompanying drawing, except that no provision was made for direct cooling of the interfaces between the plastic composition and the forming parts, where they were flowed through an 8-inch long annular passage between the die and mandrel. The external diameter of the die used was approximately 4 inches. A 27-megacycle dielectric field was uniformly imposed between the outer electrodes by means of a generator as the material was fed through the extruder by a worm screw at a rate such that 4–5 feet of pipe were extruded per minute. The temperature at the point of emergence from the end of the passage was about 375° F. The pipe, which was just sufficiently cured to be form-holding upon emergence, was fully cured by latent or residual heat by the time it reached a conventional cooling bath about 45 seconds later, the cooling bath beginning about three feet from the end of the extruder. About a gallon per minute of a General Electric silicone oil with a boiling point of about 395° F. and a flash point of 575° F. was used as coolant in the case where both die and mandrel were cooled. Where only the die was cooled, only about ½-gallon per minute was used. The temperature of the circulating coolant was approximately 310° F. Where completely closed systems are used, it is advisable to use a liquid coolant with a boiling point of not less than about 390° F. to prevent any undesirable pressure buildup.

A comparison of the three samples of pipe extruded in this example immediately showed the tremendous importance of this invention to the entire plastic pipe industry. For the sample extruded where no cooling was done, it was necessary to shut down the extruder entirely after about two minutes of operation even before ten feet of pipe had been extruded because of stoppage of extrusion several times in that short period due to sticking. In other words, what little pipe was emerging from the extruder was doing so with difficulty in what can perhaps best be described as spurts. At the time of shut-down no pipe at all was emerging, and the extruder was completely clogged by sticking of both the outer surface of the pipe to the die and the inner surface to the mandrel. The three or four feet of pipe actually extruded was pitted inside and out, and the outside was convoluted and wavy.

Prior to the present invention it was felt that merely cooling the die might result in a smooth-surfaced pipe of uniform diameter. However, although it was possible to continue the extrusion of the second sample for about ten minutes where the coolant oil was run through the die only, the external surface of the pipe produced was still wavy and the internal surface was also rough and pitted.

Surprisingly, none of these difficulties, viz., sticking, lack of uniformity of diameter, pitted internal and external surfaces, and waviness, particularly of the outer surface, was encountered with the third sample, where the coolant was also passed through the mandrel and the entire operation proceeded in accordance with this invention with both die and mandrel being cooled. After ten minutes of operation about 45 feet of a pipe of uniform inner and outer diameter had been extruded without any at all sticking to the die or mandrel. Both inner and outer surfaces of the pipe had a completely smooth shiny-black appearance without the faintest sign of a ripple or pin-mark.

*Example 2*

Three sections of flexible ¾-inch neoprene pipe were extruded and cured in a manner similar to that in which the polyethylene pipe of Example 1 was prepared. The apparatus used was the same as that used in Example 1 except that the dimensions were reduced correspondingly in order to extrude tubing of the ¾-inch diameter size. All three samples this time were 45-pound mixtures. However, because of their rubbery or elastomeric nature, they were fed through the charging opening in strip form, the strips having the following formula in parts by weight:

| | |
|---|---|
| Neoprene (polychloroprene) | 100 |
| Stearic acid | 0.5 |
| Phenyl-naphthylamine | 2.0 |
| Magnesia | 4.0 |
| Carbon black (medium thermal grade) | 58.0 |
| Plasticizer | 15.0 |
| Zinc oxide | 5.0 |

The material was heated in each case in the thermostatically controlled heating section to about 275° F. as in Example 1. The composition was heated to a constant temperature of approximately 307° F. during passage through the dielectrically heated shaping section. Also, as in Example 1, the tubing was form-holding upon leaving the extruder. The coolant in this example was a 60–40 mixture of glycerine and water which was introduced at approximately 100° F. The rate of extrusion was again 4–5 feet per minute. Additional heat was applied to the pipe in order to maintain the temperature at about the 307° F. level, for approximately 15 minutes after its emergence from the extruder to insure adequate curing thereof. The tubing was then cooled by passage through a cooling bath similar to that used in Example 1.

Sample No. 1 was completely unsatisfactory, it being necessary to discontinue the entire operation prior to the extrusion of more than 3 or 4 feet of tubing. The tubing extruded was very rough and wavy inside and out. Upon close examination of the die and mandrel, there had been so much gumming of the contacting surfaces of both that it was necessary to remove a thick layer of gum by the use of an appropriate organic solvent prior to introduction of the second sample.

In the case of the second sample, where the die was cooled but not the mandrel, it was possible to continue the extrusion for about 10 minutes without experiencing any difficulty. However, none of the tubing which emerged from the extruder, either before or after further heating, was free of roughness, pitting, and extreme degrees of waviness.

As a contrast to both samples 1 and 2, the third section of tubing was completely smooth on both external and internal surfaces. After 15 minutes of operation, no sticking to the die and mandrel or gumming of the extruder was encountered. No change was seen in the appearance of either surface of the tubing between the points of emergence from the die and from the final cooling zone.

Other polymer and copolymer compositions, for example, styrene-butadiene rubber compositions, may be similarly extruded and cured as in the above examples.

It will be understood that numerous modifications in the above-described process and apparatus may be made without departing from the scope of my invention. For instance, where a fluted or finned die surface may be used, providing a large heat-exchange area, air may be used advantageously as the coolant for the outer shaping part. Also, the die and mandrel may be coated with an appropriate plastic composition having a low coefficient of friction, e.g. Teflon, a tetrafluoroethylene resin, to improve smooth flow of pipe through the die. This coating may be applied over an appropriate base. In addition, supplemental strip heaters may be employed to compensate for heat losses and to maintain proper temperatures in the extruder.

Having thus described my invention, I claim:

1. A continuous method of simultaneously curing and extruding a tubular article which comprises flowing a heat curable polymeric composition the minimum practical curing temperature for which is substantially above the temperature required for satisfactory extrusion thereof through a uniform annular passage of the cross-sectional shape desired in the finished article, passing a high-frequency dielectric current through said composition while in said passage, thereby raising the internal temperature of said composition to an active, high-speed curing level, indirectly cooling the outer and inner contacting surfaces of said annular passage which contact said composition, and adjusting the flow rate of said composition and the dielectric current to which it is subjected so that, when it emerges from the end of said passage as a tubular article, the internal portion of same is sufficiently cured to maintain at least temporarily the shape of the entire finished article, and then completing the cure of said tubular article immediately after it emerges from said passage.

2. The method according to claim 1 in which the cooling of the inner contacting surface of the annular passage through which the composition is flowed is accomplished by passing a fluid coolant in indirect heat exchange with said inner contacting surface.

3. The method according to claim 1 in which the high-frequency dielectric current is passed through the composition between generator-charged, oppositely charged external electrodes and a neutral inner electrode which also serve as the outer and inner contacting surfaces of said annular passage.

4. The method according to claim 1 in which the high-frequency current is passed through the composition between an outer electrode and an oppositely charged inner electrode which also serve as the outer and inner contacting surfaces of said annular passage.

5. The method according to claim 1 in which the composition is a filled polyethylene containing a free-radical forming organic curing agent.

6. In extrusion apparatus for continuously extruding and simultaneously curing to tubular form a polymeric composition the minimum practical curing temperature for which is substantially above the temperature required for satisfactory extrusion thereof, an improved die assembly located at the discharge end of said extrusion apparatus comprising an elongated inner mandrel member concentrically mounted within an elongated outer die member thereby forming a uniform annular channel between said mandrel and die members, said mandrel member being electrically isolated from said die member, confined fluid circulating means for indirectly cooling the inner surface of said die member, a helically grooved passage positioned within said mandrel member near the outer surface of same with enclosed conduit means for introducing a fluid coolant internally to one end of said passage and enclosed conduit means for withdrawing fluid coolant from the other end of said passage, and means for imposing a high frequency dielectric field across said annular channel.

7. In extrusion apparatus for continuously extruding and simultaneously curing to tubular form a polymeric composition the minimum practical curing temperature for which is substantially above the temperature required for satisfactory extrusion thereof, an improved die assembly located at the discharge end of said extrusion apparatus comprising an elongated inner mandrel member concentrically mounted within an elongated outer die member thereby forming a uniform annular channel between said mandrel and die members, said mandrel member being electrically isolated from said die member, said die member being divided longitudinally into a plurality of electrodes electrically insulated from each other and each of which is connected to the opposite side of a high frequency generator from that to which immediately adjacent ones are connected, confined fluid circulating means for indirectly cooling the inner surface of said die member and confined fluid circulating means for indirectly cooling the outer surface of said mandrel member.

References Cited in the file of this patent

UNITED STATES PATENTS

| | | |
|---|---|---|
| 2,354,714 | Strickland | Aug. 1, 1944 |
| 2,461,630 | Cozzo | Feb. 15, 1949 |
| 2,583,329 | Eckert | Jan. 22, 1952 |
| 2,612,656 | Lyon | Oct. 7, 1952 |
| 2,633,602 | Sverdrup | Apr. 7, 1953 |
| 2,867,004 | Levison et al. | Jan. 6, 1959 |
| 2,887,721 | Blanchi et al. | May 26, 1959 |
| 2,902,716 | Colombo | Sept. 8, 1959 |
| 2,904,664 | Rothacker | Sept. 15, 1959 |
| 2,930,083 | Vostovich et al. | Mar. 29, 1960 |